United States Patent
Colak et al.

(10) Patent No.: US 7,898,999 B2
(45) Date of Patent: Mar. 1, 2011

(54) WIRELESS MULTI-PATH TRANSMISSION SYSTEM (MIMO) WITH CONTROLLED REPEATERS IN EACH SIGNAL PATH

(75) Inventors: Sel B. Colak, Eindhoven (NL); Johan P. M. G. Linnartz, 'S-Hertogenbosch (NL); Ludovicus M. G. M. Tolhuizen, Waalre (NL); Maurice H. J. Draaijer, Ittervoort (NL); Paulus H. A. Damink, Eindhoven (NL); Luca Giangaspero, Bari (IT); Ronald Rietman, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 752 days.

(21) Appl. No.: 10/598,571

(22) PCT Filed: Feb. 28, 2005

(86) PCT No.: PCT/IB2005/050727

§ 371 (c)(1),
(2), (4) Date: Dec. 7, 2007

(87) PCT Pub. No.: WO2005/088914

PCT Pub. Date: Sep. 22, 2005

(65) Prior Publication Data

US 2008/0165718 A1 Jul. 10, 2008

(30) Foreign Application Priority Data

Mar. 10, 2004 (GB) ................................. 0405334.4

(51) Int. Cl.
*H04B 7/14* (2006.01)

(52) U.S. Cl. ................. 370/315; 370/255; 370/392; 370/334; 370/331

(58) Field of Classification Search .............. 370/315, 370/255, 392, 334, 331
See application file for complete search history.

(56) References Cited

U.S. PATENT DOCUMENTS

| | | | |
|---|---|---|---|
| 5,859,874 A * | 1/1999 | Wiedeman et al. | 375/267 |
| 5,978,364 A | 11/1999 | Melnik | |
| 2003/0124976 A1* | 7/2003 | Tamaki et al. | 455/15 |
| 2003/0142643 A1 | 7/2003 | Yang et al. | |
| 2005/0014464 A1* | 1/2005 | Larsson | 455/11.1 |

FOREIGN PATENT DOCUMENTS

| | | |
|---|---|---|
| EP | 0999717 A2 | 10/2000 |
| JP | 2002037152 A | 8/2003 |
| WO | 02078365 A1 | 10/2002 |

* cited by examiner

*Primary Examiner*—Barry W Taylor

(57) ABSTRACT

Methods for exchanging signals via a network with nodes (11-15) improve the performance of the network by letting a destination node (12) s receive the signals originating from a source node (11) via different first and second signal routes, and by processing and correlating these signals in the destination node (12). In dependence of a correlation result, a process for processing a signal in a node (11-15) is adjusted. This process may be situated in the destination node (12), or in the source node (11) or an io intermediate node (13-15), in which case a control signal is to be exchanged. A learning algorithm for the adjusting of the process can be run in the nodes (11-15). Label switched routing can be introduced, whereby the label signal is sent from the source node (11) to the destination node via a third signal route different from the first and second signal route, to improve the efficiency of the nodes (11-15).

13 Claims, 3 Drawing Sheets

WIRELESS MULTI-PATH TRANSMISSION SYSTEM (MIMO) WITH CONTROLLED REPEATERS IN EACH SIGNAL PATH

The invention relates to a method for exchanging signals via nodes, and also relates to a destination node, a source node, an intermediate node, a network and a circuit.

Examples of such networks are mesh connected local area networks and mesh connected wide area networks.

A prior art method is known from U.S. Pat. No. 5,978,364, which discloses a method for routing data packets within a wireless, packet-hopping network. This method combines a prior art purely random routing method and a prior art purely deterministic routing method to maximise the probability of succesful transmissions.

When transmitting radio frequency signals from a source node to a destination node, the radio frequency signals may be scattered. Such scatterings create reflected and diffracted radio frequency signals. Many years ago, it was thought that these scatterings would only cause inter-symbol interference and increase the noise in the radio frequency signals. But some years ago it has been realised that the scatterings may be used to increase the performance of wireless networks, like for example the channel capacity between the source node and the destination node.

Prior art methods are disadvantageous, inter alia, due to exchanging signals in a relatively non-optimal way.

It is an object of the invention, inter alia, to provide a method for exchanging signals in a relatively optimal way.

Furthers objects of the invention are, inter alia, to provide a destination node, a source node, an intermediate node, a network and a circuit for exchanging signals in a relatively optimal way.

The method according to the invention for exchanging signals via nodes comprises the steps of
- at a source node, processing a source signal and transmitting the source signal to a destination node via a first signal route comprising an intermediate node and via a different second signal route, with at least one signal route being a wireless signal route;
- at the destination node, receiving a first destination signal corresponding with the source signal and having followed the first signal route;
- at the destination node, receiving a second destination signal corresponding with the source signal and having followed the second signal route;
- at the destination node, processing and correlating the first and second destination signal; and
- in dependence of a correlation result, adjusting a process for processing a signal at a node.

The source node either comprises one output like for example one antenna for transmitting the source signal via the first and second signal routes to the destination node, or comprises two or more outputs like for example two or more antennas for transmitting a first source signal via the first signal route and a second source signal via the second signal route to the destination node. The destination node comprises two or more inputs like for example two or more antennas for receiving the first destination signal and the second destination signal. The fact that the first destination signal and the second destination signal each correspond with the source signal indicates that these signals comprise the same data content, audio content and/or video content. The processing of the first destination signal and of the second destination signal for example comprises transformations and (de)codings and RAKE calculations. The correlation of the first and second destination signal with each other results in an indication, which depends on propagation differences between the signal routes. By adjusting a process for processing a signal at a node in dependence of a correlation result, at this node, the processing is adjusted in such a way that future signals are exchanged in a more optimal way. As a result, the performance of the network comprising these nodes is improved.

It should be noted that a node, which is a source node in a certain section of a network and/or at a certain moment in time, may be a destination node or an intermediate node in an other section of the network and/or at an other moment in time. The same holds for a node being a destination node or an intermediate node in the certain section of the network and/or at the certain moment in time. Further, between a source node and a destination node, many more intermediate nodes may be present, in a serial way and/or in a parallel way. A node may be coupled to and/or form (part of a subnetwork.

In case of inputs and outputs comprising antennas, the signals will be radio frequency signals. Other kinds of inputs and outputs are not to be excluded, like for example infrared transmitters and infrared receivers, and other transmitters and receivers in lighting infrastructures etc.

An embodiment of the method according to the invention is defined in that the process comprises the processing at the destination node. In this case, at the destination node, the processing of the first and second destination signal is adjusted. Then, the performance of the destination node is improved, and the receival of a future first and second destination signal is improved.

An embodiment of the method according to the invention is defined by further comprising the step of
- at the destination node, transmitting, in response to the correlation result, a control signal to the source node for the adjusting of the process;

wherein the process comprises the processing at the source node. In this case, the source node is informed of the correlation result via the control signal, and at the source node, the processing of the source signal is adjusted. Then, the performance of the source node is improved, and the transmission of a future source signal is improved.

An embodiment of the method according to the invention is defined by further comprising the steps of
- at the intermediate node, receiving an intermediate signal corresponding with the source signal;
- at the intermediate node, processing the intermediate signal; and
- at the destination node, transmitting, in response to the correlation result, a control signal to the intermediate node for the adjusting of the process;

wherein the process comprises the processing at the intermediate node. In this case, the intermediate node is informed of the correlation result via the control signal, and at the intermediate node, the processing of the intermediate signal is adjusted. Then, the performance of the intermediate node is improved, and the receival and/or the transmission of a future intermediate signal is improved.

An embodiment of the method according to the invention is defined by further comprising the step of
- at a node, running a learning algorithm for the adjusting of the process.

Such a learning algorithm is of common general knowledge itself and may be implemented either in the destination node only or in the node in which the process is adjusted. The learning algorithm stores adaptations made in the past. In case of the performance being improved, the adaptations are to be continued in the same direction as before. In case of the performance being deteriorated, the adaptations are to be reversed and are then to be made in an opposite direction. Stochastic learning itself is for example disclosed on, inter alia, pages 1394 and 1395 of "Neural network using the longitudinal modes of an injection laser with external feedback", IEEE J. Quantum Electronics, vol. 7, 1996, by S. B. Colak, J. J. H. B. Schleipen and C. T. H. Liedenbaum.

An embodiment of the method according to the invention is defined by further comprising the steps of at the source node, generating a label signal for labelling the source signal and transmitting the label signal to the destination node via a third signal route different from the first and second signal route; and at the destination node, detecting the label signal.

Such a label signal allows for label switched routing, which itself is of common general knowledge. The source node comprises a further output for transmitting this label signal, and the destination node comprises a third input for receiving this label signal. By using the third route for the transmission of the label signal, the destination node can be informed of a coming arrival of the first and second destination signal. Further, it is possible to inform the one or more intermediate nodes of the coming arrival of the intermediate signals via such a label signal. This way, the efficiency of the destination node and of the intermediate nodes is increased a lot (speed of response—a faster network with small latency).

The further output at the source node and the third input at the destination node preferably comprise an infrared transmitter and an infrared receiver, with the other inputs and outputs at the source node and the destination node then preferably comprising antennas. In this case, the label signal is an infrared signal, and the other signals are radio frequency signals.

An embodiment of the method according to the invention is defined by further comprising the steps of at the destination node, further processing at least two subsignals of at least one destination signal, which subsignals have followed subroutes of at least one signal route, with these subroutes being different from each other.

An input of the destination node may comprise at least two subinputs. In case of the input being an antenna array, each subinput is formed by a part of this antenna array. In case of the input being a collection of infrared receivers, each subinput may be formed by one infrared receiver. By further processing the subsignals received this way, the performance of the destination node is further improved. This further processing of the subsignals for example comprises transformations and (de)codings and RAKE calculations. Adaptivity methods for antenna array purposes are disclosed on, inter alia, page 28, column 2 paragraph 2 of "Spatial and temporal communication theory using adaptive antenna array", IEEE Personal Comm., February 1998, by R. Kohno.

Embodiments of the destination node according to the invention and of the source node according to the invention and of the intermediate node according to the invention correspond with the embodiments of the method according to the invention. Embodiments of the network according to the invention and of the circuit according to the invention correspond with the embodiments of the nodes according to the invention.

The invention is based upon an insight, inter alia, that scatterings may be used to increase the performance of wireless networks, and is based upon a basic idea, inter alia, that such scatterings can be simulated by transmitting a signal via different routes/nodes in a network. By processing and correlating the signals received and, in dependence of a correlation result, adapting a process for processing a signal in the network, the performance of the network is improved.

The invention solves the problem, inter alia, to provide a method for exchanging signals in a relatively optimal way, and is advantageous, inter alia, in that the network can be designed with relatively much freedom and can be extended in a relatively easy way.

These and other aspects of the invention will be apparent from and elucidated with reference to the embodiments(s) described hereinafter.

IN THE DRAWINGS

Figure 1:
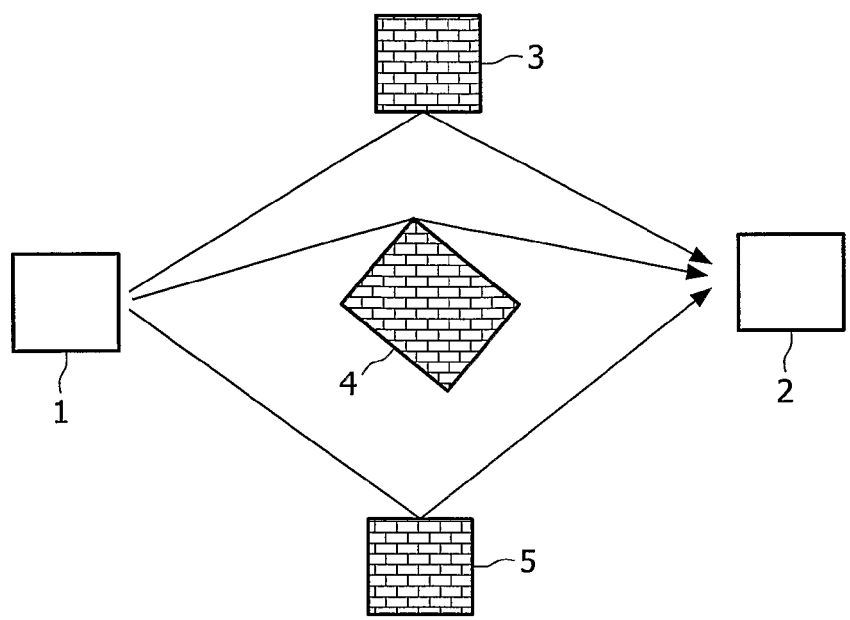
FIG. 1 shows in block diagram form a prior art multi-path scattering environment.

The prior art multi-path scattering environment as shown in FIG. 1 in block diagram form comprises a transmitter 1 and a receiver 2 and three buildings 3-5. A signal transmitted by the transmitter 1 arrives three times at the receiver 2: twice reflected via the buildings 3 and 5, and once diffracted via the building 4.

Many years ago, it was thought that such scatterings would only cause inter-symbol interference and increase the noise in the signals. But some years ago it has been realised that the scatterings may be used to increase the performance of wireless networks, like for example the channel capacity between a source node and a destination node.

Figure 2:
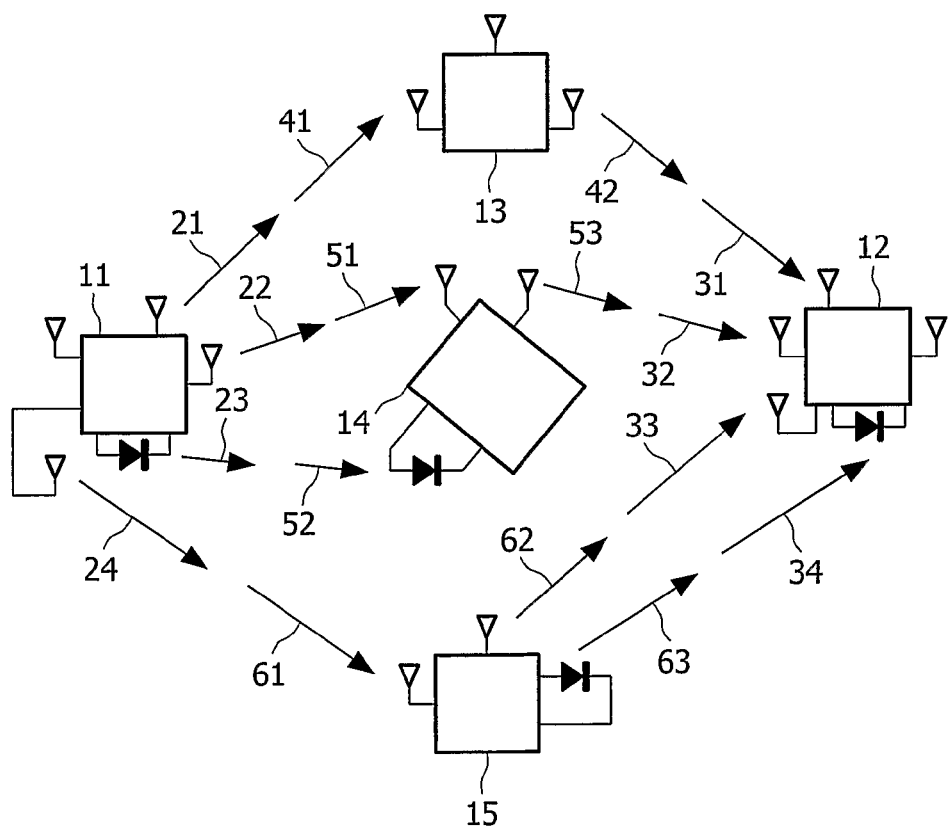
FIG. 2 shows in block diagram form a network according to the invention comprising one or more nodes according to the invention.

The network according to the invention as shown in FIG. 2 in block diagram form comprises one or more nodes according to the invention, like a source node 11, a destination node 12 and/or intermediate nodes 13-15. The source node 11 transmits a first source signal 21 to the intermediate node 13 and transmits a second source signal 22 to the intermediate node 14 and transmits a third source signal 23 to the intermediate node 14 and transmits a fourth source signal 24 to the intermediate node 15. The first, second and fourth source signals 21,22,24 are for example radio frequency signals and the third source signal 23 is for example an infrared signal, which all for example comprise the same data content, audio content and/or video content (or coded combinatory sets of such contents).

The intermediate node 13 receives a first intermediate signal 41 corresponding with the first source signal 21 and transmits a second intermediate signal 42 to the destination node 12. The intermediate node 14 receives a third intermediate signal 51 corresponding with the second source signal 22 and receives a fourth intermediate signal 52 corresponding with the third source signal 23 and transmits a fifth intermediate signal 53 to the destination node 12. The intermediate node 15 receives a sixth intermediate signal 61 corresponding with the fourth source signal 24 and transmits a seventh intermediate signal 62 and an eighth intermediate signal 63 to the destination node 12. The first, second, third, fifth, sixth and seventh intermediate signals 41,42,51,53,61,62 are for example radio frequency signals and the fourth and eighth intermediate signals 52,63 are for example infrared signals, which for example all comprise the same data content, audio content and/or video content (or coded combinatory sets of such contents). The fact that an intermediate signal corresponds with a source signal indicates that both signals comprise the same data content, audio content and/or video content.

The destination node 12 receives a first destination signal 31 corresponding with the second intermediate signal 42 from the intermediate node 13 and receives a second destination signal 32 corresponding with the fifth intermediate signal 53 from the intermediate node 14 and receives a third destination signal 33 corresponding with the seventh intermediate signal 62 and a fourth destination signal 34 corresponding with the eighth intermediate signal 63 from the intermediate node 15. The first, second and third destination signals 31,32, 33 are for example radio frequency signals and the fourth destination signal 34 is for example an infrared signal, which all for example comprise the same data content, audio content and/or video content (or coded combinatory sets of such contents). The fact that a destination signal corresponds with an intermediate signal indicates that both signals comprise the same data content, audio content and/or video content.

A first signal route is for example followed by the signals 21,41,42,31. A second signal route is for example followed by the signals 22,51,53,32. A third signal route is for example followed by the signals 23,52,53,32. A fourth signal route is for example followed by the signals 24,61,62,33. A fifth signal route is for example followed by the signals 24,61,63,34. Further signal routes are not to be excluded. For example, a further signal route could flow via two or three of the intermediate nodes 13-15, and another signal route could flow directly from the source node to the destination node. A node may further communicate wiredly and/or wirelessly with further nodes not shown and/or with a further network not shown, and may represent a subnetwork etc.

At the destination node 12, the different destination signals 31-34 are, usually individually, processed, and, usually for example per pair, correlated. In dependence of one or more correlation results, one or more processes for processing signals in one or more nodes 11-15 are to be adjusted. By adjusting these processes in dependence of the correlation results, in these nodes 11-15, the processing is adjusted in such a way that future signals are exchanged in a more optimal way. As a result, the performance of the network comprising these nodes 11-15 is improved. This will be described in greater detail for FIG. 4.

It should be noted that a node, which is a source node in a certain section of a network and/or at a certain moment in time, may be a destination node or an intermediate node in an other section of the network and/or at an other moment in time. The same holds for a node being a destination node or an intermediate node in the certain section of the network and/or at the certain moment in time. For example, in case of a further node not shown being situated near and being able to communicate wirelessly with the node 12, as soon as the node 12 has received, processed and correlated the destination signals described above, the node 12 will transmit the signal to the further node, and at this moment, the node 12 has suddenly become a source node 12. So, the function of each node 11-15 depends on the section of the network which is active and/or on the moment in time at which activities take place.

Figure 3:
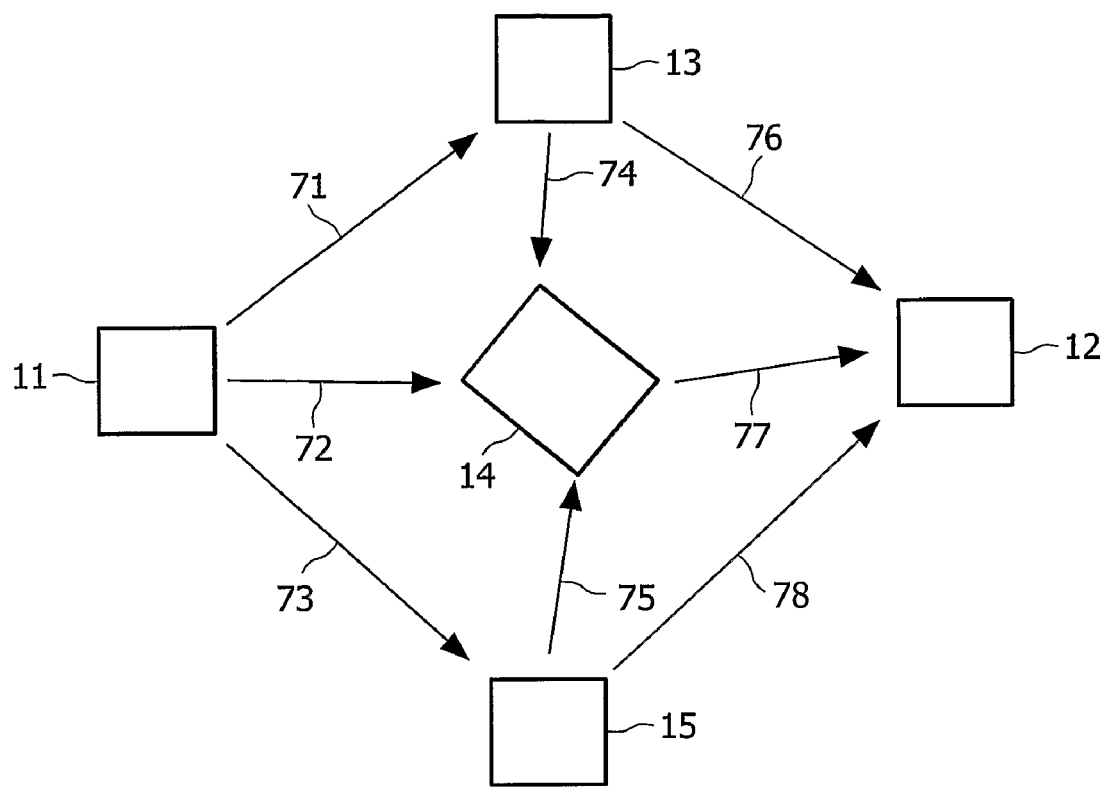
FIG. 3 shows in schematical form a network according to the invention with signal paths for guiding space-time-coded signals in combination with weighting coefficients.

The network according to the invention as shown in FIG. 3 in schematical form comprises the same nodes 11-15, whereby a signal path 71 is present from node 11 to node 13, a signal path 72 is present from node 11 to node 14, a signal path 73 is present from node 11 to node 15, a signal path 74 is present from node 13 to node 14, a signal path 75 is present from node 15 to node 14, a signal path 76 is present from node 13 to node 12, a signal path 77 is present from node 14 to node 12, and a signal path 78 is present from node 15 to node 12. Via these signal paths 71-78, space-time-coded signals are transmitted, and weighting coefficients are introduced per path ($w_1$ for path 71, $w_2$ for path 72 etc. with w usually being a complex number), as follows.

A space-time coded signal STC is sent from the node 11 via the paths 71,72,73 to the nodes 13,14,15. In the node 13, a signal $STC \cdot w_1$ is received, in the node 14, a signal $STC \cdot w_2$ is received, and in the node 15, a signal $STC \cdot w_3$ is received. The node 14 further receives via the path 74 a signal $STC \cdot w_1 \cdot w_4$ and receives via the path 75 a signal $STC \cdot w_3 \cdot w_5$. The node 12 receives via the path 76 a signal $STC \cdot w_1 \cdot w_6$, and receives via the path 77 a signal $STC \cdot (w_2 + w_1 \cdot w_4 + w_3 \cdot w_5) \cdot w_7$, and receives via the path 78 a signal $STC \cdot w_3 \cdot w_8$. This is all under the assumption that the space-time coded signal STC itself is not changed inside the nodes 13-15. The signals received by the node 15 are to be correlated, and in dependence of one or more correlation result, the weighting coefficients $w_1$ for path 71, $w_2$ for path 72 etc. are to be adjusted. The adjustment of a weighting coefficient for a path is usually done in one of the two nodes forming the start and the end of this path. Further, in dependence of one or more correlation results, in each node, the amplitude, phase and/or delay of the signal may be adapted, at carrier level and/or at symbol level.

Figure 4:
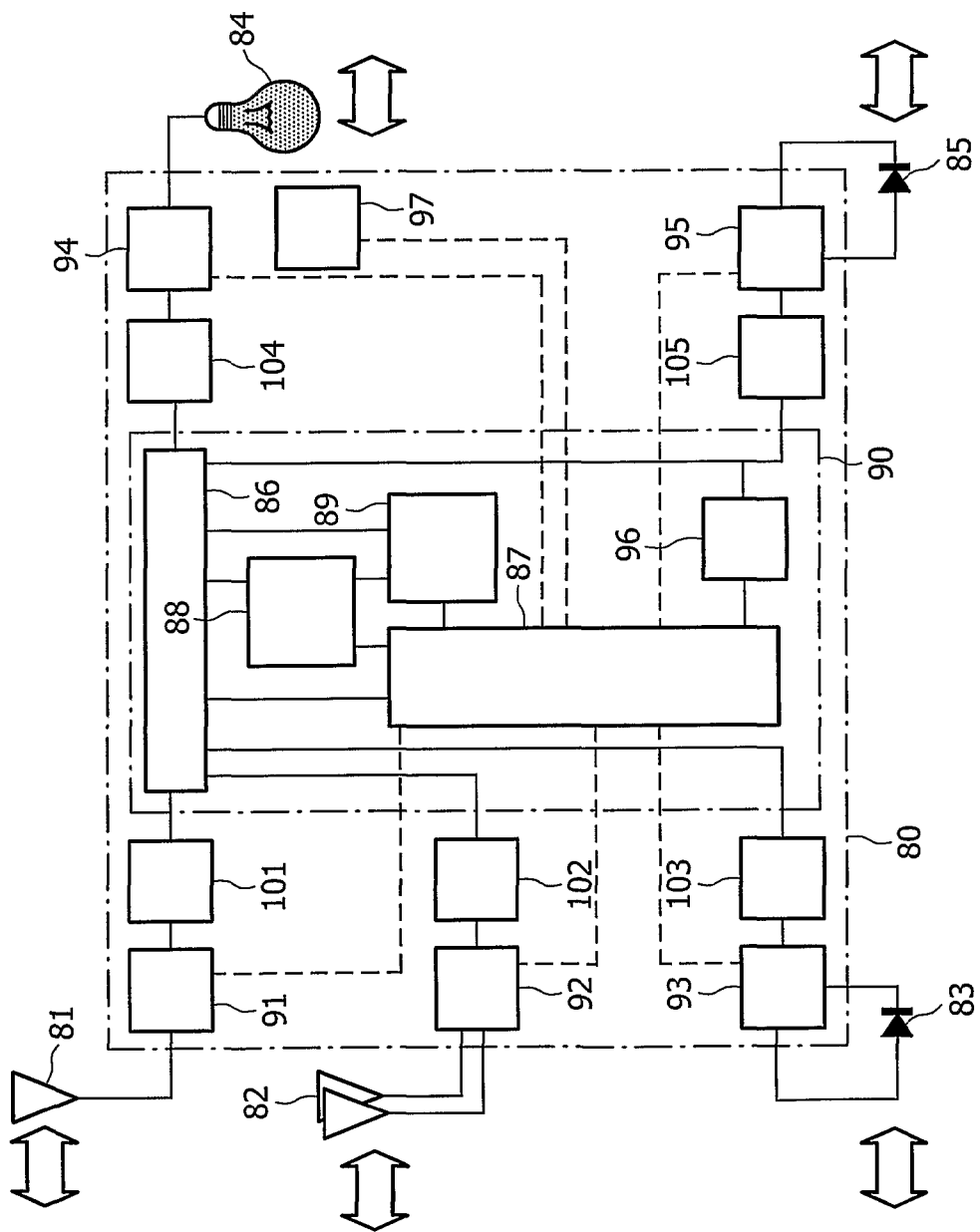
FIG. 4 shows in block diagram form a node according to the invention in greater detail.

The node 80 according to the invention as shown in FIG. 4 in greater detail in block diagram form comprises an antenna 81 coupled via a transmitting/receiving unit 91 and a further processing unit 101 to a circuit 90, comprises two antennas 82 coupled via a transmitting/receiving unit 92 and a further processing unit 102 to the circuit 90, comprises an infrared transmitter/receiver 83 coupled via a transmitting/receiving unit 93 and a further processing unit 103 to the circuit 90, comprises an light transmitter/receiver 84 coupled via a transmitting/receiving unit 94 and a further processing unit 104 to the circuit 90, and comprises an infrared transmitter/receiver 85 coupled via a transmitting/receiving unit 95 and a further processing unit 105 to the circuit 90. The circuit 90 comprises a buffer/switch 86 coupled to each further processing unit 101-105 and to a processing unit 87 and to a controller 88 and to a correlating unit 89, with the controller 88 comprising a memory and further being coupled directly to the processing unit 87 and the correlating unit 89. The latter units 87 and 89 are also coupled directly to each other. The processing unit 87 is further coupled to each transmitting/receiving unit 91-95 for controlling purposes, and to a unit 96 for label detection, which unit 96 is further coupled to the further processing unit 105. Any labels received via for example the infrared transmitter/receiver 85 and detected and/or processed by the unit 96 can be highly useful to switch any signals arriving via the antennas 81 and 82 and the other transmitter/receivers 83 and 84 by using label switching to speed up the operation of the node. The processing unit 87 is further coupled to a unit 97 which is further coupled to the light transmitter/receiver 84 for controlling the light transmitter/receiver 84, like for example in a Light Infrastructure re-use for Multimedia Broadcast Application style network. This unit 97 is for example further coupled to a power supply not shown in FIG. 4.

In case of the node 80 representing the destination node 12, for example two destination signals are received, the first destination signal 31 arriving via the antenna 81 and the second destination signal 32 arriving via the antennas 82. The first destination signal 31 passes the transmitting/receiving unit 91 for amplification, frequency translation, filtering, demodulation etc. and passes the further processing unit 101 to be discussed later. The second destination signal 32 passes the transmitting/receiving unit 92 for amplification, frequency translation, filtering, demodulation etc. and passes the further processing unit 102 to be discussed later. Via the buffer/switch 86, both signals are supplied to the processing unit 87 for performing one or more transformations, one or more (de)codings and/or one or more RAKE calculations etc. Then both signals are supplied to the correlating unit 89 for being correlated. The correlation of the first and second destination signal 31,32 with each other results in an indication, which depends on propagation differences between the signal routes followed by these destination signals (and their previous intermediate signals and their previous source signals).

According to a first option, in dependence of a correlation result, the process comprising the processing of the destination signals 31,32 is adjusted. In other words, in dependence of the correlation result, the processing unit 87 is adjusted in such a way that future destination signals arriving at this node 80 are dealt with in a more optimal way. The adjustment of the processing unit 87 for example comprises an adjustment of the weighting coefficients discussed for FIG. 3 and/or comprises an adjustment of the one or more transformations, of the one or more (de)codings and/or of the one or more RAKE calculations etc. Alternatively and/or in addition, a further adjustment of the amplitude, of the phase and/or of the delay of the signal, at carrier level and/or at symbol level can be made via the couplings between the processing unit 87 and the transmitting/receiving units 91,92. So, the processing in the processing unit 87 and/or in the transmitting/receiving units 91,92 is adjusted, and as a result, the performance of the network comprising this node 80 is improved.

These adjustments are such that the correlation between the received signals is at least reduced and preferably minimized. In other words, the destination signals should be at least less correlated than before and preferably uncorrelated as much as possible.

According to a second option, in dependence of a correlation result, for example the controller 88 generates a control signal which via either transmitting/receiving unit 91,92 and antenna 81,82 or via an other transmitting/receiving unit 93-95 and transmitter/receiver 83-85 is transmitted to the source node 11 or the intermediate node 13,14 for in these nodes 11,13,14 adjusting a process for processing source signals or intermediate signals as discussed below.

In case of the node 80 representing the source node 11, for example two source signals are transmitted, the first source signal 11 via the antenna 81 and the second source signal 22 via one or more of the antennas 82. Thereto, a data signal, an audio signal and/or a video signal is possibly processed in the processing unit 87, which performs one or more transformations and/or one or more (de)codings etc. Then the signal is supplied, via the buffer/switch 86, to the transmitting/receiving unit 91 for modulation, filtering, frequency translation, amplification etc. and to the transmitter/receiver 92 for modulation, filtering, frequency translation, amplification etc. for being transmitted via the antennas 81,82 as the first and second source signal. Thereby, the signals pass the further processing units 101,102 to be discussed later. After some time, the above described control signal arrives, either via the transmitting/receiving unit 91,92 and antenna 81,82 or via an other transmitting/receiving unit 93-95 and transmitter/receiver 83-85. In response to this control signal, the process comprising the processing of the source signals 21,22 is adjusted. In other words, in dependence of the correlation result of the correlation performed in the destination node 12, the processing unit 87 is adjusted in such a way that future source signals to be transmitted from this node 80 are dealt with in a more optimal way. The adjustment of the processing unit 87 for example comprises an adjustment of the weighting coefficients discussed for FIG. 3 and/or comprises an adjustment of the one or more transformations, of the one or more (de)codings etc. Alternatively and/or in addition, a further adjustment of the amplitude, of the phase and/or of the delay of the signal, at carrier level and/or at symbol level can be made. So, the processing in the processing unit 87 and/or in the transmitting/receiving units 91,92 is adjusted, and as a result, the performance of the network comprising this node 80 is improved.

In case of the node 80 representing the intermediate node 13, for example the first intermediate signal 41 is received via the antenna 81 and the second intermediate signal 42 is transmitted via one or more of the antennas 82. The first intermediate signal 41 passes the transmitting/receiving unit 91 for amplification, frequency translation, filtering, demodulation etc. and passes the further processing unit 101 to be discussed later. Via the buffer/switch 86, the signal is supplied to the processing unit 87 for performing one or more transformations and one or more (de)codings etc. Then, the processing unit 87 again performs, possibly in a reversed way, the one or more transformations and the one or more (de)codings etc. and the signal is supplied, via the buffer/switch 86, to the transmitting/receiving unit 92 for modulation, filtering, frequency translation, amplification etc. for being transmitted via the antenna 82 as the second intermediate signal 42. Thereby, the signal passes the further processing units 102 to be discussed later. After some time, the above described control signal arrives, either via the transmitting/receiving unit 91,92 and antenna 81,82 or via an other transmitting/receiving unit 93-95 and transmitter/receiver 83-85. In response to this control signal, the process comprising the processing of the intermediate signals 41,42 is adjusted. In other words, in dependence of the correlation result of the correlation performed in the destination node 12, the processing unit 87 is adjusted in such a way that future intermediate signals to be received by and/or to be transmitted from this node 80 are dealt with in a more optimal way. The adjustment of the processing unit 87 for example comprises an adjustment of the weighting coefficients discussed for FIG. 3 and/or comprises an adjustment of the one or more transformations, of the one or more (de)codings etc. Alternatively and/or in addition, a further adjustment of the amplitude, of the phase and/or of the delay of the signal, at carrier level and/or at symbol level can be made. So, the processing in the processing unit 87 and/or in the transmitting/receiving units 91,92 is adjusted, and as a result, the performance of the network comprising this node 80 is improved.

Preferably, in node 80, a learning algorithm is run for the adjusting of the process, for example via the controller 88. In case of the node 80 representing the destination node 12, the algorithm is located close to the correlating unit which generates the correlation results. In case of the node 80 representing the source node 11 or the intermediate node 13, the algorithm will react to the control signal coming from the destination node 12. Such a learning algorithm is of common general knowledge itself and stores adaptations made in the past. In case of the performance being improved, the adaptations are to be continued in the same direction as before. In case of the performance being deteriorated, the adaptations are to be reversed and are then to be made in an opposite direction.

Preferably, at the source node 11, a label signal is generated, for example via the controller 88, for labelling the source signal 21,22. This label signal is however transmitted to the destination node 12 separately from the source signal 21,22 via a third signal route different from the first and second signal route. At the destination node 12, the label signal is detected, for example via the unit 96, in case of the label signal arriving via transmitter/receiver 85. Such a label signal allows for label switched routing, which itself is of common general knowledge. Thereto, the source node 11 for example uses the transmitter/receiver 83, and the destination node 12 for example uses the transmitter/receiver 85. By using the third route for the transmission of the label signal, the destination node 12 can be informed of a coming arrival of the first and second destination signal 31,32. Further, it is possible to inform the one or more intermediate nodes 13-15 of the coming arrival of the intermediate signals via such a label signal. This way, the efficiency of the destination node 12 and of the intermediate nodes 13-15 is increased a lot.

Each one of the further processing units 101-104 may, like the further processing unit 105, also be coupled to a label detection unit. Alternatively, such a label detection unit may have a more centralized location for example close to the buffer/switch 86, and/or may for example be integrated into the further processing units 101-105 and/or into the processing unit 87 etc.

The transmitting/receiving units 91-95 for example represent a physical layer (comprising a physical medium dependent sublayer and a physical medium attachment layer and a physical coding sublayer) and/or a radio frequency part of a transceiver, and the further processing units 101-105 for example represent a data link layer (comprising a medium access control sublayer and a logical link control sublayer) and/or a baseband part of a transceiver. In that case, processing unit 87, controller 88 and/or correlating unit 89 take care of the network layer (IP packets) and the transport layer (TCP protocol), and the processing unit 87 can easily control the transmitting/receiving units 91-95, due to a media independent interface being present between the physical layer and the data link layer. At this media independent interface, the necessary digital signals of a protocol exist. Further, the transmitting/receiving units 91-95 comprise circuits like filters, amplifiers, mixers, controlled oscillators, delay lines, gain controllers, delay lines, converters etc. which easily allow for example the adjustment of an amplitude and/or of a phase or a delay.

Preferably, instead of for example one antenna 81 or 82, an antenna array is used. In that case, at least one of the destination signals 31,32 will comprise at least two subsignals, which subsignals have followed different subroutes of at least one signal route. Or, instead of for example one transmitter/receiver 83, 84 or 85, an array of transmitters/receivers is used. When using arrays, the further processing units 101-105 will need to perform a more complex further processing. This further processing of the subsignals for example comprises transformations and (de)codings and RAKE calculations etc. A further processing unit 101-105 then for example comprises per subsignal a number of delay elements coupled serially to each other, with their outputs and the input of the first delay element being coupled to inputs of multipliers for multiplying their input signals with a coefficient. Outputs of these multipliers are coupled to inputs of a summing element for summing the output signals of these multipliers, for all subsignals arrived via the array. In response to the correlation results and/or the control signal, the number of delay elements as well as the coefficients can be adjusted, for improving the performance of the network. So, in case of using arrays, a further process might be adjusted in addition.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. Method for exchanging signals via nodes (11-14) and comprising the steps of
   at a source node (11), processing a source signal (21,22) and transmitting the source signal (21,22) to a destination node (12) via a first signal route comprising an intermediate node (13,14) and via a different second signal route, with at least one signal route being a wireless signal route;
   at the destination node (12), receiving a first destination signal (31) corresponding with the source signal (21,22) and having followed the first signal route;
   at the destination node (12), receiving a second destination signal (32) corresponding with the source signal (21,22) and having followed the second signal route;
   at the destination node (12), processing and correlating the first and second destination signal (31,32) with each other; and
   in dependence of a correlation result, adjusting a process for processing a signal at a node (11-14) such that transmission of a future source signal is improved.

2. Method according to claim 1, wherein the process comprises the processing at the destination node (12).

3. Method according to claim 1, further comprising the step of
   at the destination node (12), transmitting, in response to the correlation result, a control signal to the source node (11) for the adjusting of the process;
   wherein the process comprises the processing at the source node (11).

4. Method according to claim 1, further comprising the steps of
   at the intermediate node (13,14), receiving an intermediate signal (41,51) corresponding with the source signal (21, 22);
   at the intermediate node (13,14), processing the intermediate signal (41,51); and
   at the destination node (12), transmitting, in response to the correlation result, a control signal to the intermediate node (13,14) for the adjusting of the process;
   wherein the process comprises the processing at the intermediate node (13,14).

5. Method according to claim 1, further comprising the step of
   at a node (11-14), running a learning algorithm for the adjusting of the process.

6. Method according to claim 1, further comprising the steps of
   at the source node (11), generating a label signal for labelling the source signal (21,22) and transmitting the label signal to the destination node (12) via a third signal route different from the first and second signal route; and
   at the destination node (12), detecting the label signal.

7. Method according to claim 1, further comprising the steps of
   at the destination node (12), further processing at least two subsignals of at least one destination signal (31,32), which subsignals have followed subroutes of at least one signal route, with these subroutes being different from each other.

8. Destination node (12) comprising
   a receiving unit (91-95) for receiving a first destination signal (31) corresponding with a source signal (21,22) and having followed a first signal route comprising an intermediate node (13,14) and for receiving a second destination signal (32) corresponding with the source signal (21,22) and having followed a different second signal route, which source signal (21,22) has been processed and transmitted by a source node (11), and with at least one signal route being a wireless signal route;
   a processing unit (87) for processing the first and second destination signal (31,32);
   a correlating unit (89) for;
      correlating the first and second destination signal (31, 32) with each other, and
      in dependence of a correlation result, adjusting a process for processing a signal at a node (11-14) such that transmission of a future source signal is improved.

9. Destination node (12) according to claim 8, wherein the process comprises the processing by the processing unit (87) at the destination node (12).

10. Source node (11) comprising
    a processing unit (87) for processing a source signal (21, 22);
    a transmitting unit (91-95) for transmitting the source signal (21,22) to a destination node (12); and a receiving unit (91-95) for receiving a control signal from the destination node (12) for adjusting the processing unit (87) such that transmission of a future source signal is improved;
    which destination node (12) is arranged to receive a first destination signal (31) corresponding with the source signal (21,22) and having followed a first signal route comprising an intermediate node (13,14) and is arranged to receive a second destination signal (32) corresponding with the source signal (21,22) and having followed a different second signal route, with at least one signal route being a wireless signal route, and which destination node (12) is arranged to process the first and second destination signal (31,32) and is arranged to correlate the first and second destination signal (31,32) with each other and is arranged to, in response to a correlation result, transmit the control signal to the source node (11).

11. Intermediate node (13,14) comprising
    a processing unit (87) for processing an intermediate signal (41,51); and
    a receiving unit (91-95) for receiving the intermediate signal (41,51) corresponding with a source signal (21,22) transmitted by a source node (11) to a destination node (12) and for receiving a control signal from the destination node (12) for adjusting the processing unit (87) such that transmission of a future source signal is improved;
    which destination node (12) is arranged to receive a first destination signal (31) corresponding with the source signal (21,22) and having followed a first signal route comprising the intermediate node (13,14) and is arranged to receive a second destination signal (32) corresponding with the source signal (21,22) and having followed a different second signal route, with at least one signal route being a wireless signal route, and which destination node (12) is arranged to process the first and second destination signal (31,32) with each other and is arranged to correlate the first and second destination signal (31,32) and is arranged to, in response to a correlation result, transmit the control signal to the intermediate node (13,14).

12. Network which comprises one or more destination nodes (12) said destination node comprising:
    a receiving unit (91-95) for receiving a first destination signal (31) corresponding with a source signal (21,22) and having followed a first signal route comprising an intermediate node (13,14) and for receiving a second destination signal (32) corresponding with the source signal (21,22) and having followed a different second signal route, which source signal (21,22) has been processed and transmitted by a source node (11), and with at least one signal route being a wireless signal route;
    a processing unit (87) for processing the first and second destination signal (31,32);
    a correlating unit (89) for;
       correlating the first and second destination signal (31, 32) with each other, and
       in dependence of a correlation result, adjusting a process for processing a signal at a node (11-14) such that transmission of a future source signal is improved.

13. Circuit (90) for use in a destination node (12) comprising a receiving unit (91-95) for receiving a first destination signal (31) corresponding with a source signal (21,22) and having followed a first signal route comprising an intermediate node (13,14) and for receiving a second destination signal (32) corresponding with the source signal (21,22) and having followed a different second signal route, which source signal (21,22) has been processed and transmitted by a source node (11), and with at least one signal route being a wireless signal route, which circuit (90) comprises
    a processing unit (87) for processing the first and second destination signal (31,32);
    a correlating unit (89) for:
       correlating the first and second destination signal (31, 32) with each other, and
       in dependence of a correlation result, adjusting a process for processing a signal at a node (11-14) such that transmission of a future source signal is improved.

* * * * *